Figure 1:
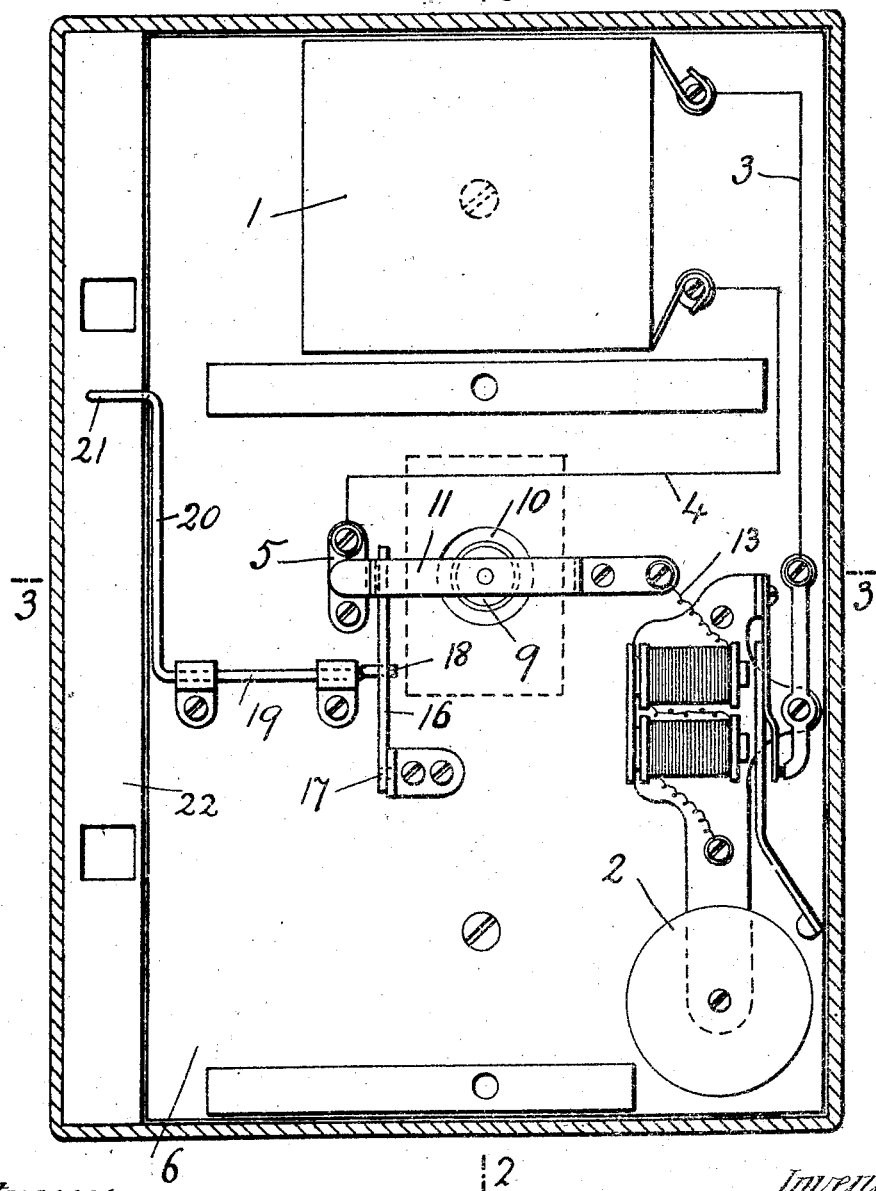

S. MUNDLER.
ALARM FOR BOXES AND OTHER RECEPTACLES.
APPLICATION FILED OCT. 23, 1911.

1,027,272.

Patented May 21, 1912.
2 SHEETS—SHEET 1.

Witnesses
F. H. Barry
E. W. Callaghan

Inventor
Samuel Mundler
By Munn & Co.
Attorneys

S. MUNDLER.
ALARM FOR BOXES AND OTHER RECEPTACLES.
APPLICATION FILED OCT. 23, 1911.
1,027,272.
Patented May 21, 1912.
2 SHEETS—SHEET 2.
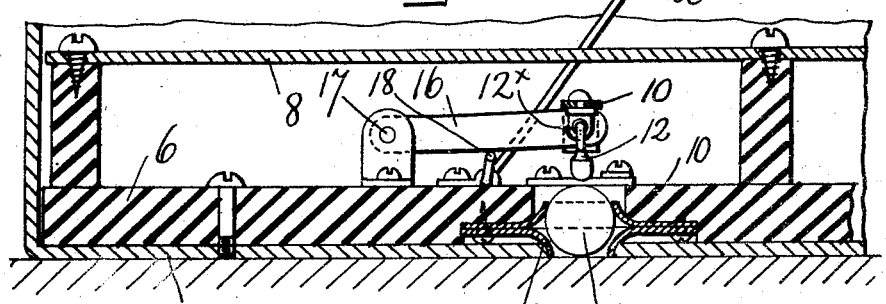
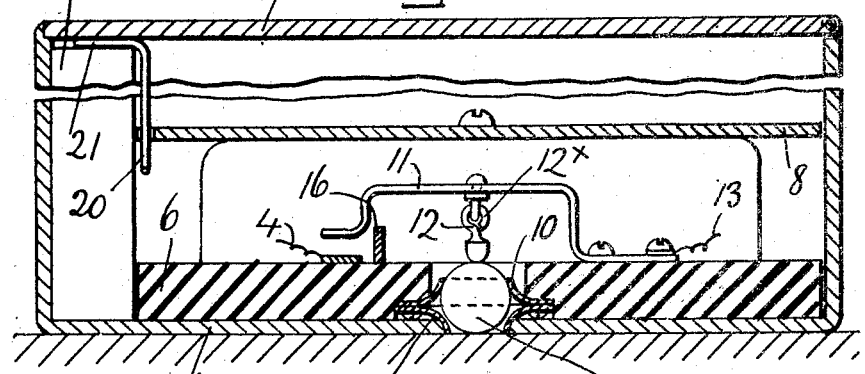
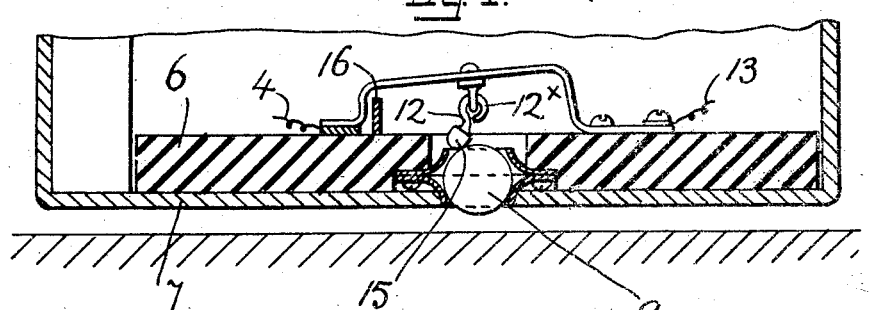
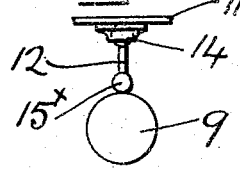
Witnesses
F. C. Barry
E. N. Callaghan
Inventor
Samuel Mundler
By Munn & Co.
Attorneys

UNITED STATES PATENT OFFICE.

SAMUEL MUNDLER, OF LONDON, ENGLAND.

ALARM FOR BOXES AND OTHER RECEPTACLES.

1,027,272. Specification of Letters Patent. Patented May 21, 1912.

Application filed October 23, 1911. Serial No. 656,129.

*To all whom it may concern:*

Be it known that I, SAMUEL MUNDLER, a subject of the Emperor of Austria-Hungary, and a resident of London, England, have invented certain new and useful Improvements in Alarms for Boxes and other Receptacles; and I do hereby declare the following to be a full, clear, and exact description of the same.

This invention relates to improvements in alarms for portable cash-boxes and other receptacles (hereinafter referred to as "boxes") of the kind comprising electric bell or the like sound producing mechanism (hereinafter referred to as a "bell"), an electric cell, and spring operated circuit closing mechanism provided at the base of the box and adapted to be set so that immediately the box is moved by an unauthorized person the electric bell is operated, or to be set out of action when an authorized person desires to move the box about.

The present invention has for its primary object to provide electric bell circuit closing mechanism which is more sensitive and more reliable in action and cannot be tampered with, and also has for its object to provide apparatus of a simpler and improved construction and arrangement.

According to the present invention, a ball of metal or other suitable material is loosely mounted at the bottom of the box so that it projects therebelow, and is slightly raised in relation to the bottom when the box is placed upon a flat surface. Above the ball and within the box is a spring or spring actuated switch forming part of the electric bell circuit. To the switch is secured a depending member free to swing in all directions. The depending member is suitably formed at its lower end and may be supported in a state of equilibrium upon the top of the ball so as to hold up the switch and keep the circuit open when the box is resting still upon a flat surface. The least displacement and movement of the box and consequently of the ball will, however, cause the lower end of the depending member to slip sidewise off the top of the ball, and allow the switch to close the circuit and ring the bell. The bell will continue ringing until the circuit is broken again by means arranged within the box and accessible only to an authorized person.

The invention is illustrated in the accompanying drawings, in which:—

Figure 1 is a sectional plan of a box constructed according to the present invention; Fig. 2 is a part longitudinal vertical section on 2—2, Fig. 1; Fig. 3 is a part transverse vertical section on 3—3, Fig. 1, but showing parts in a different position; Fig. 4 is a part transverse vertical section, but showing parts in a different position; Fig. 5 is a detail of a modification.

Referring to the drawings, 1 is an electric cell, 2 is an electric bell, 3 and 4 are conductors connecting the terminals of the cell respectively to one terminal of the bell and to a contact block, 5. All these parts are mounted on an insulating base, 6 on the bottom, 7 of the box, which has a false bottom, 8 for the contents to rest upon.

9 is the ball mounted at the bottom of the box between cups, 10 so as to be free to revolve and rise and fall in relation to the bottom, 7.

11 is the spring switch mounted on the base, 6 above the ball, 9; and 12 is the depending member secured to the switch. The switch is connected by a conductor, 13 to one terminal of the bell. The depending member may be secured to the switch, 11 by an eye, $12^x$ as shown in Figs. 1 to 4; or by a ball-and-socket-joint, 14 as shown in Fig. 5. The lower end of the depending member may be formed as a shoe, 15 having a convex surface as shown in Figs. 1 to 4, or may be formed as a second ball, $15^x$ as shown in Fig. 5.

16 is an arm pivotally mounted at 17 on a bracket rising from the base. The free end of the arm is arranged beneath the switch, 11 and is adapted to be raised by a crank, 18 on a spindle, 19 adapted to be operated by a lever, 20 having a handle 21 all arranged within the box. In its two extreme positions, the lever, 20 is held with its handle, 21 resting against the upper edge of the lock casing, 22 of the box, so as to be covered by the lid, 23.

The operation of the device is as follows:—In setting the device for operation, the box is rested upon a support and the lever, 20 is slowly turned (to the left Fig. 2) so as to allow the arm, 16 to descend gently (Fig. 3), and the depending member to rest vertically upon the top of the ball, 9 and hold up the switch 11. If, now, the ball is displaced the depending member will slide thereoff and the switch will cease to be supported and will close the bell circuit. If an authorized person desires to render the alarm inoperative, he may do so by opening the box and turning the lever, 20 (to the right Fig. 2) so as to raise the arm, 16 and the switch, 12.

What I do claim as my invention and desire to secure by Letters Patent is:—

1. In a burglar alarm, the combination with a cash box or other receptacle having a cavity through the bottom, of an electric bell circuit, and mechanism for closing said circuit, said mechanism comprising a spring member, a member freely depending from and controlling the latter, and a ball mounted with facility of rising falling and rolling movements in said cavity and so as to project below the bottom of the receptacle, said depending member being adapted to stand on the top of said ball, substantially as described.

2. In a burglar alarm, the combination with a cash box or other receptacle having a cavity through the bottom, of an electric bell circuit, and mechanism for closing said circuit, said mechanism comprising a spring switch, a member freely depending from and controlling the switch, upper and lower ring like flanges in said cavity, and a ball mounted between said flanges with facility of rising falling and rolling movements and so as to project below the bottom of the receptacle, said depending member being adapted to stand on the top of said ball, substantially as described.

3. In a burglar alarm, the combination with a cash box or other receptacle having a cavity through the bottom, of an electric bell circuit, and mechanism for closing said circuit, said mechanism comprising a spring switch permanently connected to one terminal of the bell circuit and adapted to make contact with the other terminal of the bell circuit, a member freely depending from and controlling the switch, upper and lower ring like flanges in said cavity, and a ball mounted between said flanges with facility of rising falling and rolling movements and so as to project below the bottom of the receptacle, said depending member being adapted to stand on the top of said ball, substantially as described.

4. In a burglar alarm, the combination with a cash box or other receptacle having a cavity through the bottom, of an electric bell circuit, and mechanism for closing said circuit, said mechanism comprising a spring switch, a member freely depending from and controlling the switch and having a convex lower end, and a ball mounted with facility of rising falling and rolling movements in said cavity and so as to project below the bottom of the receptacle, said depending member being adapted to stand on the top of said ball, substantially as described.

5. In a burglar alarm, the combination with a cash box or other receptacle having a cavity through the bottom, of an electric bell circuit, and mechanism for closing said circuit, said mechanism comprising a spring switch, a member freely depending from and controlling the switch, a ball and socket joint connecting the depending member to the switch, and a ball mounted with facility of rising falling and rolling movements in said cavity and so as to project below the bottom of the receptacle, said depending member being adapted to stand on the top of said ball, substantially as described.

6. In a burglar alarm, the combination with a cash box or other receptacle having a cavity through the bottom, of an electric bell circuit, and mechanism for controlling said circuit, said mechanism comprising a spring switch, a member freely depending from and controlling the switch, a ball mounted with facility of rising falling and rolling movements in said cavity and so as to project below the bottom of the receptacle, said depending member being adapted to stand on the top of said ball, a pivotally mounted arm beneath said switch for lifting the same so that said depending member does not stand on said ball and for setting the depending member so that it does stand on said ball, and a cranked spindle for raising said arm, substantially as described.

In testimony whereof I affix my signature, in presence of two subscribing witnesses.

SAMUEL MUNDLER.

Witnesses:
GRACE AYRES,
ALFRED DAY.